UNITED STATES PATENT OFFICE.

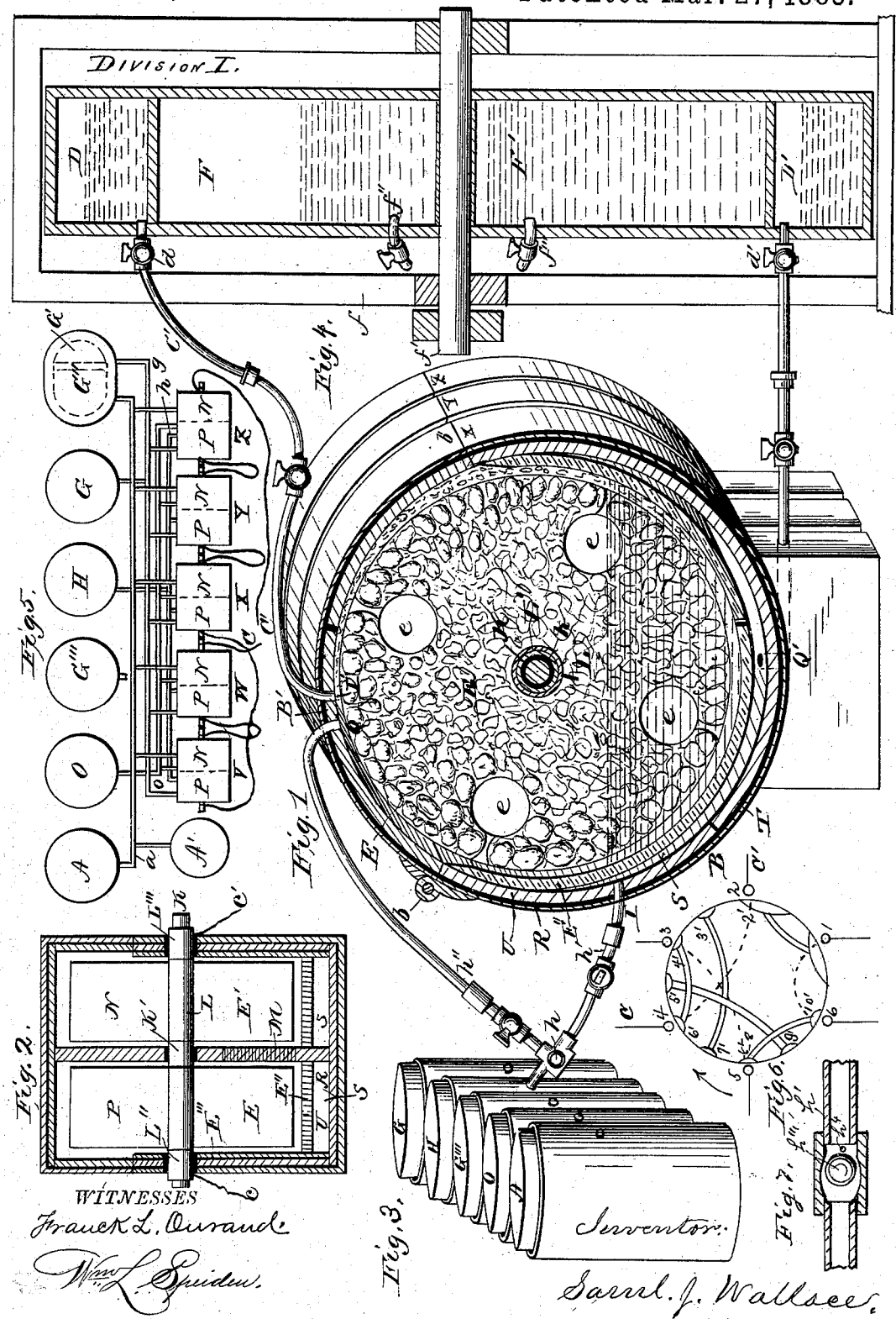

SAMUEL J. WALLACE, OF KEOKUK, IOWA.

ELECTRIC GENERATOR.

SPECIFICATION forming part of Letters Patent No. 274,865, dated March 27, 1883.

Application filed December 8, 1882. (No model.)

*To all whom it may concern:*

Be it known that I, SAMUEL JACOB WALLACE, a citizen of the United States, residing at Keokuk, in the county of Lee and State of Iowa, have invented certain new and useful Improvements in Processes of and Apparatus for Generating Electricity; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to the generation and use of electricity; and it consists in several generic and specific features of process and apparatus therefor, which are practiced and made substantially as set forth hereinafter, and as shown in the drawings, in which—

Figure 1 is a cross-section of the electric generator; Fig. 2, a vertical section of same at right angles to Fig. 1; Fig. 3, a part view of the holders for gases for use in the battery; Fig. 4, a sectional elevation of holder for fluid for use therein; Fig. 5, a plan of general arrangement of the parts for use. Fig. 6 shows the arrangement of a rotary switch, and Fig. 7 shows a section of a valve.

Air to supply oxygen is compressed by an apparatus at A', of any suitable construction therefor, and is stored in a gas-holder, A, of any suitable construction, provided with pipe $a$ for distributing it. Several other gas-holders, O, G''', H, and G, of any suitable construction, are made, each provided with a separate pipe, $o$, $h$, and $g$, for distribution. The pipe $a$ conveys compressed air to furnace G'', which is made in any suitable plan to generate active electro-positive gases for use in the battery in the gas-generator G', from which they pass by distributing-pipe $g$ to gas-holder G, and, when the battery is in operation, to the electric generators while still hot therefrom. These gases are made by a water-gas process from carbonaceous and sulphurous matter burned by air and steam, so as to produce hydrogen and sulphurous oxide gases, with others. In this process metalliferous ores containing any of such metals as lead, antimony, zinc, copper, silver, gold, iron, manganese, and chromium are used along with coal; and any suitable alkali—as soda, lime, or potash—is also added to unite with carbon and nitrogen to produce a cyanide for use in the battery.

The holder O, with its pipe $o$, is for oxygen liberated in the battery. Holder H and its pipe $h$ is for hydrogen liberated in the battery, and holder G''' is for positive gases which have been used once or which are very much diluted with inactive gases and are held for use at odd times. All the gases are held and used under pressure as high as practicable above the atmosphere to save space in storage, to enable them to force their way through the electric generators, and to increase their electro-chemical activity and power therein.

A fluid-holder is made of any suitable material and construction to hold the battery-fluid, and is mounted on shaft $f'$ in frame $f$, so that it may be turned. This has two or more storage-chambers, F F', for fluid of different grades or kinds, and working-chambers D D', to furnish fluid to and to receive it from the battery continuously, provided with connecting-pipes $d$ $d'$ therefor, having suitable disconnecting joints and valves for regulating or for stopping the flow. The holder can be turned to bring either working-chamber above the battery to supply fluid to it, and the other below to receive it therefrom. By suitable tube-connections to be applied therefor the fluid may be run from the upper working-chamber into either storage-chamber, and from either storage-chamber to the lower working-chamber, and the positions of the working-chambers can be reversed by turning on shaft $f'$, so that at any time the battery can be supplied with any of the kinds of fluid in storage, and the fluid from it can be stored in either chamber. In a like way the fluid from either chamber can be run into either gas-holder to absorb or act upon or be acted upon by the gases therein, and be run back for storage for use in the battery.

The battery consists of one or more electric generators, V W X Y Z. These are made of cylindrical form, either separate or in any common frame, and have trough-like bodies B, with base and lids B' hinged at $b$, and opening at $b'$, arranged to close gas-tight and resist internal pressure by suitable packing and fastenings. These generators have outside shells, T, of sheet metal or other material, and inside shells, U, of porcelain or other durable insulating material, and between them a durable insulating-lining, R, of pitch or other suitable matter to protect the outer shell and hold the inner one in place. These form walls around the whole generator—bottom, sides, ends, and lid—and insulate the interior parts. The inner wall, U, is formed of as few sections as may be. Each such inclosed generator-chamber is divided into two cells, P N, by wall M of durable non-conducting material, impervious except a portion of its lower part, and fitting closely around the sides to separate the gases in the two cells. A portion of the lower part of this wall is porous and pervious to the fluid, and is formed of a thick, close fabric woven of spun glass and asbestus fibers, and subjected to a heat to cause the glass fibers to cohere somewhat to bind the asbestus closely, or any other suitable diaphragm may be used. The ends are lined inside with porous carbon plates E''', forming electrodes and connected with the sleeves L'' L'''. These plates are formed of a thick fabric of cloth or felt, which is saturated with a thick fluid containing carbonaceous matter—such as tar, sirup, or gum—and then charred, and then saturated again and recharred at a high heat one or more times to make it a durable porous electric conductor.

The bent shell E'' is a porous plate of carbon formed in the same way, and connects gas-tight at each of its edges, along the sides and ends of the cell, with an open space, S, below it and small perforations along the bottom at one side of the center, which admit the escape of gas up under the electrode E on the shaft above. The shaft K, as shown, passes by gas-tight bearings K' L'' L''' through the middle and end walls, and has an insulating covering, k, of rubber or other material, upon which is an outer shell, L', in two parts, of copper, which are separated by an insulating section through the center wall. The shaft may be made in two parts insulated from each other, with the bearings arranged so as not to open through the walls, if preferred. On this shaft are hung electrodes E E', one in each cell, with copper boxes L to turn on the shaft and form conducting-connections with the sleeves thereon. The electric circuit is by wire c to bearing L'', by this to electrodes E''' and E'' and to the sleeve L' on the shaft connecting to the electrode E, and from these electrodes in cell P through the fluid and porous wall to the like electrodes in cell N, from which, by a like route reversed, it reaches wire c'.

The electrode-disks E E' are made in this way: Into a circular mold are placed, first, a thick cloth wet with a thick fluid containing sirup, gum, tar, or other carbonaceous matter, to form one side wall, and upon that broken coke, charcoal, and pulverized metalliferous ores or substances, wet with a like fluid and well intermixed with dry cotton or other loose fiber, to the thickness required, with a like cloth on top to form the other wall. The interior mass is filled in rather openly around the outside of the circle, and more close within; and a number of open spaces or pockets, e, are left or formed with contracted mouths opening out. The whole is secured in the mold, and heated to char it into a firm body, then removed and saturated in a like way with a fluid containing a solution of carbonaceous matter and metallic salts, and recharred at a very high heat to form a hard porous body suitable for an active electrode. This has close sides, an open periphery, and a porous mass filled with intricate cells, pores, and passages throughout, which has its capacity as an electrode increased by the particles and traces of metallic matter, as well as by its fine pores and passages.

Five or any other number of these generators are arranged to form a battery, V W X Y Z, as in Fig. 5, either separate or as parts of one structure, and each is connected by a branch pipe, as shown in Fig. 5 and as at h', with the distributing-pipes, with a o in cells N, and with g h in cells P, from the holders A O H G, so as to receive gases therefrom. These branches enter, as shown at I, Fig. 1, under diaphragm electrode plate E'', and each has two valves, as at h', Fig. 1, one to be set to graduate or cut off the inflow, and the other made, as in Fig. 7, or otherwise, to permit the gas to go one way but not the other. Each cell has corresponding outflow-pipes from the top, as at h'' and Q, provided with like valves, to stop or graduate the flow and stop its backflow, connecting back to the distributing-pipes and holders. That to pipe a may be arranged to blow off by a limited outlet into the air, and that to pipe g may be led to holder G'''. Each cell in this arrangement has inlets from two holders, only one of which is to be used at one time, while the other is closed by its valves, according to the effect required. The positive gases always connect with cell P, and the negative with cell N.

All substances not in solution which it is desired to introduce to the generator to assist in any desired result, either to increase the electric current, to increase the catalytic force of the electrodes, or the electrolytic qualities of the fluid, to assist in special reactions, to furnish material for use in power-storage, or to furnish desirable products, are placed in pockets e in the rotary electrodes, and are held in by plugs of asbestus fibers, slag-wool, or by other means. Substances in solution to be added may be mixed in the fluid holder.

The plan view shows the wires connected in two series—V W in one and X Y Z in the other—which are connected so that what is direct through the latter are the reverse through the former, with the terminal ends C C' ready for connecting together for a closed circuit or otherwise. Fig. 6 shows a circular switch for use in such a case, where 2 and 3 would represent the terminal wires of the larger series X Y Z, (C' being that shown disconnected in Fig. 5,) and 4 and 5 those of the other and smaller series, V W, (C being the disconnected terminal in Fig. 5.) The internal part of this circular switch is rotary and can be turned to bring different set of points 1', 2', 3', 4', 5', 6', 7', 8', 9', and 10' on its periphery in connection with a series of six terminal wires, 1, 2, 3, 4, 5, and 6. Different pairs of these internal points are connected by insulated parts, as shown, or in any other suitable way. When connected and arranged as shown in Fig. 6 it throws all the battery into one direct series in circuit with the terminals 1 and 6 of an outside circuit for useful work, and when turned, as shown by the arrow, one point around, the connections are made, as shown by dotted lines, which cuts the battery out of the working-circuit and closes it into a circuit to itself, with its two sections reversed, as shown in plan, Fig. 5, with the two terminals joined. By this means the whole battery can be instantly thrown into circuit for work or cut out and thrown into a circuit for storage at intervals as often as or of any length desired. When arranged for such use the generators of the smaller and reversible section V W are connected with the pipes $o$ $h$ open, and those of the other and larger section, X Y Z, which is not reversible, with pipes $a$ $g$ open. Then, when they are connected as in Fig. 6, generators X Y Z take and use furnace-gas from G and air from A, and generators V W take and use oxygen from O and hydrogen from H, and when connected the other way the section using air and gases from holder G continue to do so, and the others, having the reversed current, decompose water and liberate its gases in the same cells which received them before from the holders. The gases in these generators V W, when used therein, leave a comparative vacuum therein, into which the gases under pressure in the holder force themselves by the branch pipes, as at $h'$, continuously, and when new gases are liberated therein they force themselves to the holders by the outlet branch pipes, as at $h''$. In this way the actions are automatic, and always ready to go on as soon as the circuit is changed either way, and the capacity for storage is not limited by the generators themselves, for one set may store up force in gases to be used in another set or in themselves, and the battery is never idle. If not at work in an outside circuit as a whole, it is at work storing up force from cheap diluted furnace-gases and air into pure oxygen and hydrogen for future uses.

When continuous moderate work in external circuit is wanted, all the generators are connected with pipes $a$ $g$ only, open, using then the cheapest and weakest form of materials as their source of force; but when the greatest force is required all are connected with holders O H only, using the strongest form of gaseous source.

The generators being filled partly with active electrolytic fluid, the gases from the holders force themselves into each cell at I into space S below the porous electrode E, and forces the fluid down and out of this space, so that the gaseous matter can escape by the perforations upward at the bottom. This electrode, thus having fluid on one side and above it and gases on the other side and below it, and being finely porous, absorbs both, so as to bring them into intimate contact together and with itself, so as to produce electro-chemical tension, and, when a capable circuit is made, to produce chemical union of the active gas and an electric current therefrom. The gases from space S escape upward from the perforations in electrode E'' against the lower side of rotary electrode E at one side of the center. Into this the gases enter to partly fill its passages, interstices, cells, and pores, so as to cause it to turn by the flotation of the one side and bring continuously new parts over the gas in the fluid, to be partly filled with the gas in turn. This action distributes the gas throughout the whole mass of the electrode along with the active fluid, which is carried along in its intricate passages, cells, and pores, and upon its greatly-extended irregular surfaces, so that the active gases and fluid are partly absorbed together into its pores, and partly brought into intimate contact together in contact with its active parts, and caused to act in the same way as in electrode E'' to unite and produce an electric current upon the same principles as in Grove's gas-battery. The parts of the fluid and gas in contact are continually renewed in this way, and the parts which are or become inactive have a chance to escape, the gases upward and the fluid down, each escaping by its appropriate pipe at Q for gases at the top, and at Q' for fluid at the bottom. The gas is continuously renewed at I, as recited, and the fluid at I' at top from the supply working-chamber D. The fluid drops in at I' onto one side of the electrode E, and runs into it, so as to carry it down in the same way the incoming gas tends to turn it. In dropping in it is arranged to separate, to avoid electric connection from the cell, and the inlet-pipe $d$ and outlet-pipe $d'$, with their connecting-chambers, are suitably insulated against short-circuiting between the cells. The electrode is turned by these two incoming streams of gas and fluid, and, when required, by mechanical means, by shaft $k$, and as it turns it carries the gases held in it down into the fluid and brings the fluid up into the gas, to bring them together and intermix them forcibly in continuously-renewed active and running contact with each other and the electrode to cause their union and produce an electric current, the fluid continually running down and the gas continually rising through the active electrode. The heat of the incoming positive gases from the furnace keeps up a high and active temperature through the apparatus to greatly increase the action. Any other suitable means are used, when required, to keep up as high a heat as may be desired for this purpose above that of the natural conditions to the extent which the materials used will bear to advantage. Where very high heats are intended, the apparatus is specially built and arranged to resist them.

The apparatus is made as concentrated as practicable. The space is closely filled and surrounded by active electrode materials filled throughout with interstices, passages, and pores to greatly extend their contact-surfaces to avoid internal resistance of the current in traversing the fluid and to increase the power of the apparatus. For this purpose the store of gases and fluid within it is made small, and they are both all the time changed and renewed to keep up the highest activity. The active positive gases in this way pass through the generator-cell P beneath and above the fluid and its hydrostatic level, in contact with the active electrode and fluid in an electric circuit, so as to be taken into chemical union and oxidized; the hydrogen into water, and the sulphurous oxide into sulphuric acid, which together form an active electrolytic fluid for use in the battery, and for other uses, and generate at the same time an equivalent electric current through the circuit. The other positive constituents of the gas, as well as those held in the pockets $e$ and those held by previous deposit through the electrode, together with those in solution and suspension in the fluid which come in contact with the electrodes in cell P, are acted upon each in its own appropriate way and proportion to increase the electric current; and suitable constituents are provided among these to improve the fluid and often to produce other desired results. Oxygen is taken into union in a like way in cell N, to supply the equivalents of that which combines with the gases and other matters in cell P. It is also absorbed by the fluid and its contents, as well as by the electrode pores in its forcible intermixture under pressure, to make them active in the cell work and in future uses. Zinc is supplied in suitable roasted or other ores or salts, or otherwise, as well as suitable other metals, to add to the qualities of the fluid and to provide a medium for the storage of force by deposit through one of the rotary electrodes, as metal, or in other suitable positive state, as in the case of lead compounds from suitable solutions, to be used as in the Faure secondary battery. This deposit is made in cell N by cutting off the supply of oxygen in the direct circuit, and in cell P, in the reverse circuit, when suitable substances are in the fluid, by the reducing action of the unsatisfied hydrogen liberated. In this case the loaded electrode is removed and stored for future use, or is used at once in the cell where deposited by reversing the circuit or by changing to the other cell with the circuit the same, when the action is the same as in a galvanic battery or secondary battery, as the case may be. In a like way useful metals are reduced from their ores or other states.

In this battery in the ways and for the purposes already indicated, nearly all organic substances, soluble or otherwise, together with lignite, soft coal, and various carbonaceous and hydrocarbonaceous substances, as well as metalliferous, can be used; and suitable chemicals can be added to improve the reactions desired; but it is preferred to take these in as cheap a state as economy would indicate and complete their preparation in the battery, or in some associated process, and to produce others for sale or other uses in a like way to add to and extend the economy and advantages of the process and apparatus devised.

Several of the features set forth admit of various modifications and changes in arrangement, construction, and use.

I reserve for other patents, without prejudice, such claims as might have been but are not included in this, together with such features as are not sufficiently set forth herein.

I claim—

1. The process of generating electricity and chemical action which consists in forcing into a generator having two cells and containing an active electrolytic fluid, and two electrodes, which have cavities, pores, passages, and intricate interstices, air into one cell and hot electro-positive gases containing hydrogen and sulphurous oxide ($SO_2$) into the other cell in such way that the gases will rise up through the fluid and electrode masses within and above the level of the fluid, and will carry up the fluid, so that it will be in contact with both the gases and the electrodes above and below such level in the cells, respectively, and then forcibly intermixing the fluid, gases, and electrodes by mechanical motion to cause the union of the gases, and the action of an electric current, substantially as set forth.

2. The combination, in an electro-chemical apparatus, of an electro-positive gas under a pressure greater than that due to the fluid upon it and the atmosphere, with a positive electrode element wet with an electrolytic fluid, with which the electrode forms part of the path of an electric current, and with a means for intermixing the gas and the fluid so as to oxidize the gas.

3. The combination, in an electro-chemical apparatus, of a rotary or movable positive electrode element in contact with an electro-positive gas, with an active electrolytic fluid having motion adapted to move the electrode, so the motion of the electrode will promote oxidation of the gas.

4. The combination, in an electro-chemical apparatus, of a movable electrode, with means for introducing gas below the electrode in the electrolytic fluid, so the gas will act to promote the motion of the electrode.

5. The combination, in an electro-chemical apparatus, of an electro-positive gas containing hydrogen and a compound of sulphur, with an electrolytic fluid and a positive electrode element, which, in contact, form part of the path of an electric current, so the hydrogen and sulphurous matter will be oxidized to form an electrolytic fluid for use in the apparatus.

6. The combination, in apparatus for electro-chemical purposes, of means for generating electro-positive gases from carbonaceous matter, with means for using the gases by their electro-chemical energy to promote electrolytic action, substantially as set forth.

7. In promoting electro-chemical action, the process which consists in causing an active gas to pass into contact with an electrolytic fluid and an electrode, which together form part of the path of an electric current at a heat above that due to natural conditions, to promote chemical action with the gas.

8. In promoting electro-chemical action, the process which consists in causing an active gas to pass into contact with an electrolytic substance at a heat above that due to natural conditions, to promote the union of the gas with the electrolyte to replace matter given up by that in electrolytic action.

9. The combination, in an electro-chemical apparatus, of an active gas from an external source connected by inlet with the apparatus, with an active electrolytic substance and an electrode with it in an electric circuit, and with a source of and means for applying heat thereto beyond that due to natural conditions, so that the gas will enter into chemical union thereby.

In testimony whereof I affix my signature in presence of two witnesses.

SAMUEL JACOB WALLACE.

Witnesses:
OCTAVIUS KNIGHT,
HARRY E. KNIGHT.